(12) United States Patent
Ura et al.

(10) Patent No.: US 10,747,311 B2
(45) Date of Patent: Aug. 18, 2020

(54) SOUND COLLECTING DEVICE AND SOUND COLLECTING DEVICE SET

(71) Applicant: CASIO COMPUTER CO., LTD., Shibuya-ku, Tokyo (JP)

(72) Inventors: Kazuo Ura, Fussa (JP); Futoshi Yamamoto, Hamura (JP); Toshihiro Takahashi, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/050,769

(22) Filed: Jul. 31, 2018

(65) Prior Publication Data

US 2019/0079580 A1    Mar. 14, 2019

(30) Foreign Application Priority Data

Sep. 14, 2017  (JP) ................................. 2017-176915

(51) Int. Cl.
| | | |
|---|---|---|
| *G06F 3/01* | (2006.01) | |
| *H04R 1/08* | (2006.01) | |
| *H04R 1/40* | (2006.01) | |
| *H04R 1/02* | (2006.01) | |
| *H04R 1/32* | (2006.01) | |

(Continued)

(52) U.S. Cl.
CPC .............. *G06F 3/013* (2013.01); *G06F 3/165* (2013.01); *G06F 3/167* (2013.01); *H04R 1/025* (2013.01); *H04R 1/083* (2013.01); *H04R 1/326* (2013.01); *H04R 1/406* (2013.01); *H04R 3/005* (2013.01); *H04R 25/407* (2013.01); *H04R 1/028* (2013.01); *H04R 25/552* (2013.01); *H04R 25/554* (2013.01)

(58) Field of Classification Search
None
See application file for complete search history.

(56) References Cited

U.S. PATENT DOCUMENTS 8,565,456 B2   10/2013  Nishizaki et al.
9,596,554 B2    3/2017  Sherman
(Continued)

FOREIGN PATENT DOCUMENTS

| CN | 105765486 A | 7/2016 |
| CN | 106416292 A | 2/2017 |

(Continued)

OTHER PUBLICATIONS

Chinese Office Action (and English language translation thereof) dated May 7, 2020 issued in Chinese Application No. 201810957389.7.

*Primary Examiner* — Kenny H Truong
(74) *Attorney, Agent, or Firm* — Holtz, Holtz & Volek PC

(57) ABSTRACT

A sound collecting device including: a line-of-sight detector configured to detect line-of-sight information of user's eyes; a microphone; a processor configured to control the microphone so as to achieve sensitivity in the line-of-sight direction of the eyes higher than in other directions on the basis of the line-of-sight information detected by the line-of-sight detector; and an attachment portion for attaching the line-of-sight detector and the microphone on a head portion or an ear portion, wherein the microphone is provided on each of the two positions of the attachment portion, and the processor controls a plurality of the microphones on the basis of the line-of-sight information.

6 Claims, 13 Drawing Sheets

(51) Int. Cl.
    *H04R 3/00*     (2006.01)
    *G06F 3/16*     (2006.01)
    *H04R 25/00*     (2006.01)

(56) References Cited

U.S. PATENT DOCUMENTS

| | | |
|---|---|---|
| 9,838,785 B2 | 12/2017 | Sherman |
| 9,848,260 B2 | 12/2017 | Conliffe |
| 9,880,633 B2 | 1/2018 | Komaki et al. |
| 10,097,921 B2 | 10/2018 | Sherman |
| 2014/0369537 A1* | 12/2014 | Pontoppidan .......... A61B 5/165 381/314 |
| 2014/0369573 A1 | 12/2014 | Chiu |
| 2015/0088500 A1* | 3/2015 | Conliffe ................. G02C 11/10 704/235 |
| 2017/0150230 A1 | 5/2017 | Shimura et al. |
| 2018/0206028 A1 | 7/2018 | Conliffe |

FOREIGN PATENT DOCUMENTS

| | | |
|---|---|---|
| JP | S61234699 A | 10/1986 |
| JP | H05191695 A | 7/1993 |
| JP | H09327097 A | 12/1997 |
| JP | 2012100160 A | 5/2012 |
| JP | 2017049775 A | 3/2017 |
| WO | 2016002445 A1 | 1/2016 |

\* cited by examiner

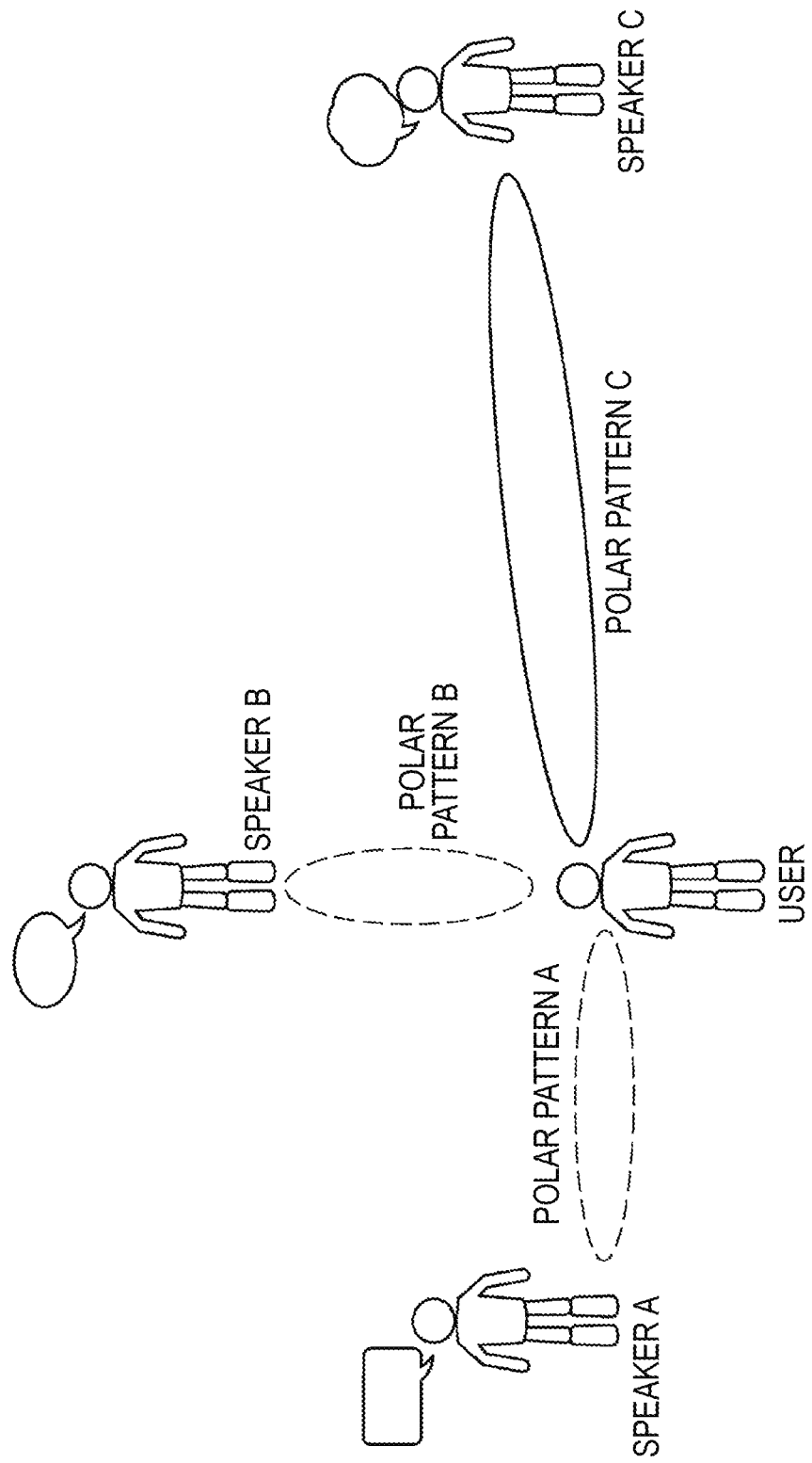

US 10,747,311 B2

SOUND COLLECTING DEVICE AND SOUND COLLECTING DEVICE SET

CROSS-REFERENCE TO RELATED APPLICATIONS

This application is based upon and claims the benefit of priority under 35 USC 119 of Japanese Patent Application No. 2017-176915 filed on Sep. 14, 2017 the entire disclosure of which, including the description, claims, drawings, and abstract, is incorporated herein by reference in its entirety.

BACKGROUND OF THE INVENTION

The present invention relates to a sound collecting device and a sound collecting device set.

DESCRIPTION OF THE RELATED ART

An auxiliary device for assisting sound collection such as a hearing aid automatically detects a sound field and automatically corrects directivity of a microphone. This device includes a problem that the region of the sound source was limited to some extent, such as a conversation with a nearby person, making it difficult to catch the voice of a person speaking at a short distance away. For the purpose of solving this, for example, Patent Document 1 (Japanese Patent Application Laid-Open No. 2012-100160) has disclosed a technique including a directional microphone for obtaining the sound in the front direction of the face and an external input terminal, and that determines whether the sound collected by the directional microphone is the sound from an external device. Moreover, Patent Document 2 (Japanese Patent Laid-Open No. 9-327097) discloses a technique of measuring and detecting the wearer's line-of-sight and driving the microphone with a motor to set the beam direction of the directional microphone to match the detection direction. In addition, Patent Document 2 also discloses a technique of changing the beam width of the directivity by a line-of-sight or an electroencephalogram.

The present invention aims to provide a sound collecting device and a sound collecting device set having an advantage of being able to control a microphone so as to achieve higher sensitivity in the line-of-sight direction of a user.

BRIEF DESCRIPTION OF THE SEVERAL VIEWS OF THE DRAWING

FIG. 8 is a diagram illustrating a relationship between a position of a speaker and a polar pattern;

DETAILED DESCRIPTION OF THE INVENTION

Figure 1:
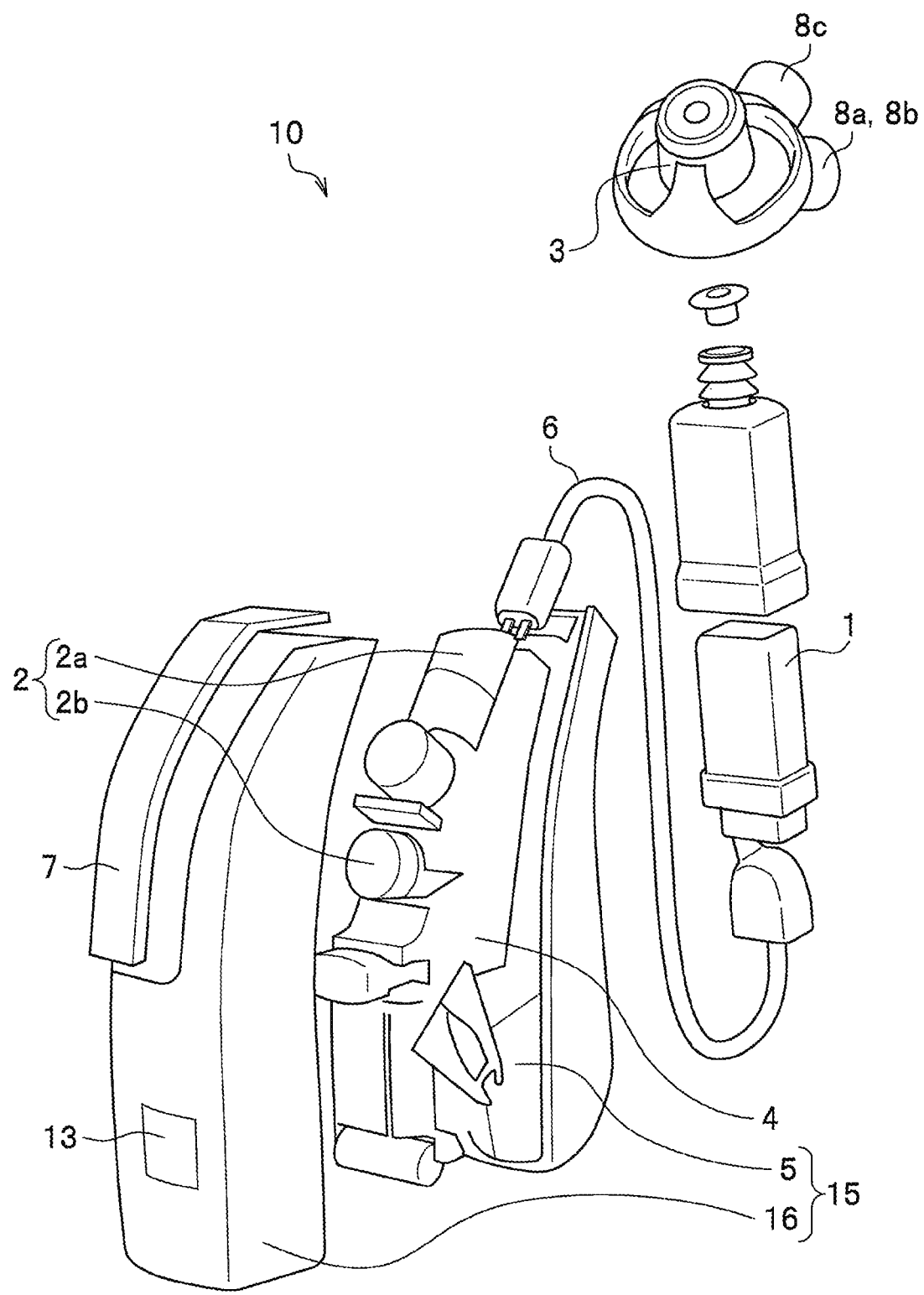
FIG. 1 is a perspective view illustrating an internal configuration of a sound collecting device in a first embodiment.

Hereinafter, embodiments of the present invention (hereinafter referred to as "the present embodiment") will be described in detail with reference to the drawings. Note that the drawings are merely schematically illustrated to the extent that the present embodiment can be sufficiently understood. In individual drawings, the same constituent elements and the same constituent elements are denoted by the same reference numerals, and duplicate descriptions thereof are omitted.

(First Embodiment)

FIG. 1 is a perspective view illustrating the internal configuration of a sound collecting device in the first embodiment.

A sound collecting device 10 is an ear hook type hearing aid used in a pair of left and right. The sound collecting device 10 includes a speaker 1, a microphone 2, a sound outlet 3, a processor 4, a battery 5, an ear wire 6, a microphone cover 7, an electro-oculography sensor 8 (8a), a ground electrode 8c, an input apparatus 13, and a main body cover 16. Here, the battery 5, the main body cover 16, or the like constitute an attachment portion 15 to be worn on the ear. Note that a left sound collecting device 10a (hearing aid) (FIG. 3) includes the electro-oculography sensor 8a and the right sound collecting device 10b (FIG. 3) includes an electro-oculography sensor 8b. In addition, the left ground electrode 8c and the right ground electrode 8c are individually pressed to the vicinity of the small ear bone and are kept at substantially same potential.

Figure 3:
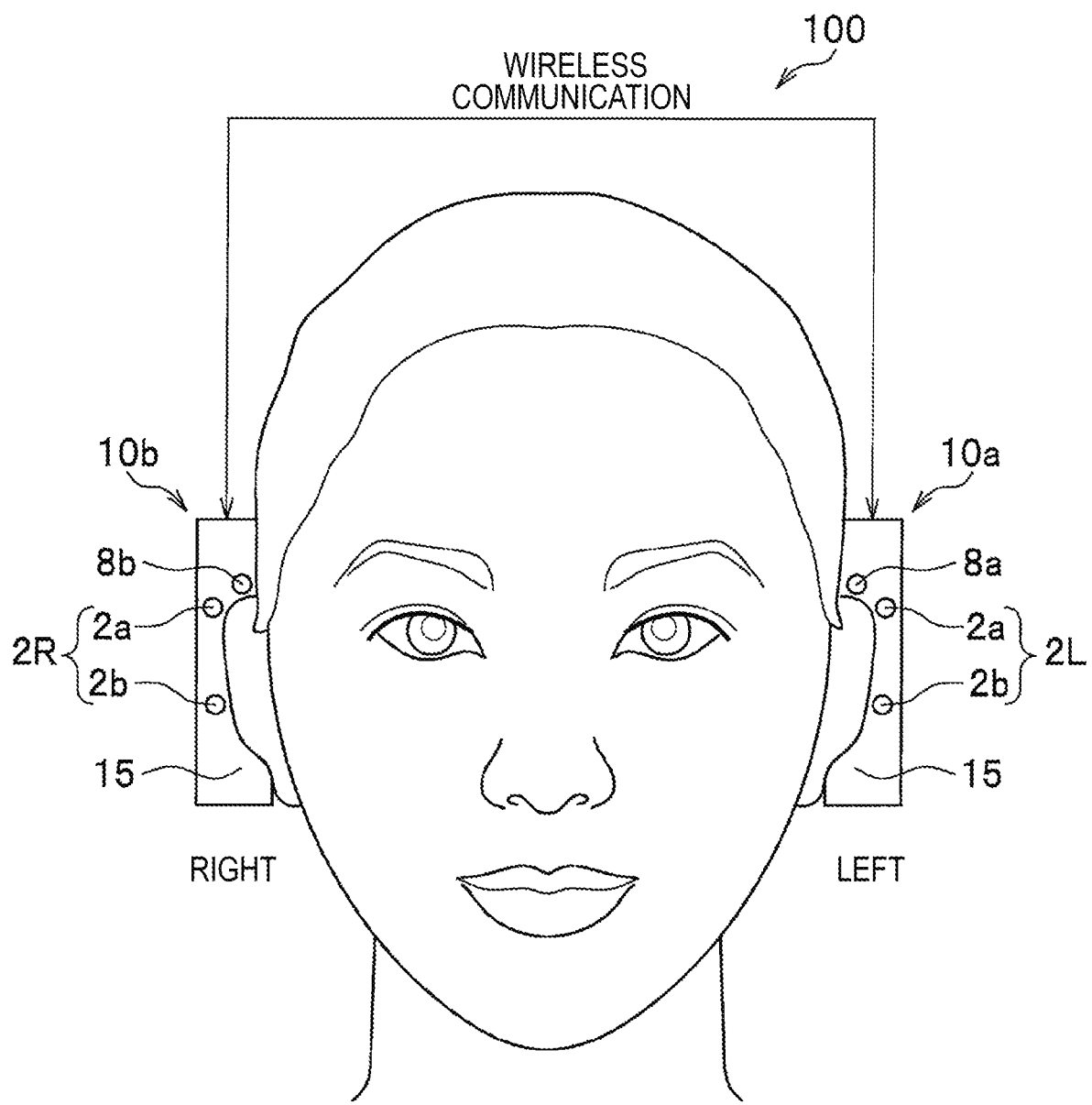
FIG. 3 is a diagram illustrating a method of using the sound collecting device set in the first embodiment.

The speaker 1 is an electroacoustic transducer (receiver, sound generating portion). The microphone 2 is a unidirectional electroacoustic transducer, and includes an upper microphone 2a and a lower microphone 2b, and also includes a microphone driving unit (not illustrated) to change the direction of each of the microphones. Hereinafter, the microphone of the left sound collecting device 10a will be referred to as a microphone 2L (FIG. 3), and the microphone of the right sound collecting device 10b will be referred to as a microphone 2R (FIG. 3). The sound outlet 3 is a sound emitting portion to which a wax guard for preventing invasion of earwax is attached. The processor 4 includes a central processing unit (CPU), an amplifier (amplifier circuit), and executes audio signal processing in accordance with a program. The battery 5 is a power supply that supplies DC power to individual portions, and is represented by a button type air battery, for example. The ear wire 6 is a wire connecting the main body and the earplug. The earplug is formed with the speaker 1, the sound outlet 3, or the like. The microphone cover 7 reduces "wind noise" that occurs when the wind hits the hearing aid.

The electro-oculography sensor 8 (8a) detects the potential (eye potential) that varies with the rotation angle of the eyeball, having the potential of the ground electrode 8c defined as a reference potential. Furthermore, the processor 4 calculates the direction of the line-of-sight direction (angle with respect to the front direction of the face) using the detected eye potential, and determines polar patterns (directivities) of the microphones 2 (left microphone 2L and right microphone 2R) using the calculated direction and the left and right parallax angles. Then, in accordance with the determined polar patterns, the processor 4 changes, by the microphone driving unit, the direction of each of the right and left microphones 2L and 2R to the direction of achieving higher sensitivity in the line-of-sight direction. Alternatively, with execution of audio signal processing of appropriately delaying either one of the microphone audio signals of the left and right microphones 2L and 2R and then sequentially combining the delayed audio signal and the other audio signal, the processor 4 eliminates the time difference of the audio signal coming from the direction of the speaker to emphasize the left and right audio signals, while shifting the phase of the audio signal coming from the other direction to attenuate.

Figure 2:
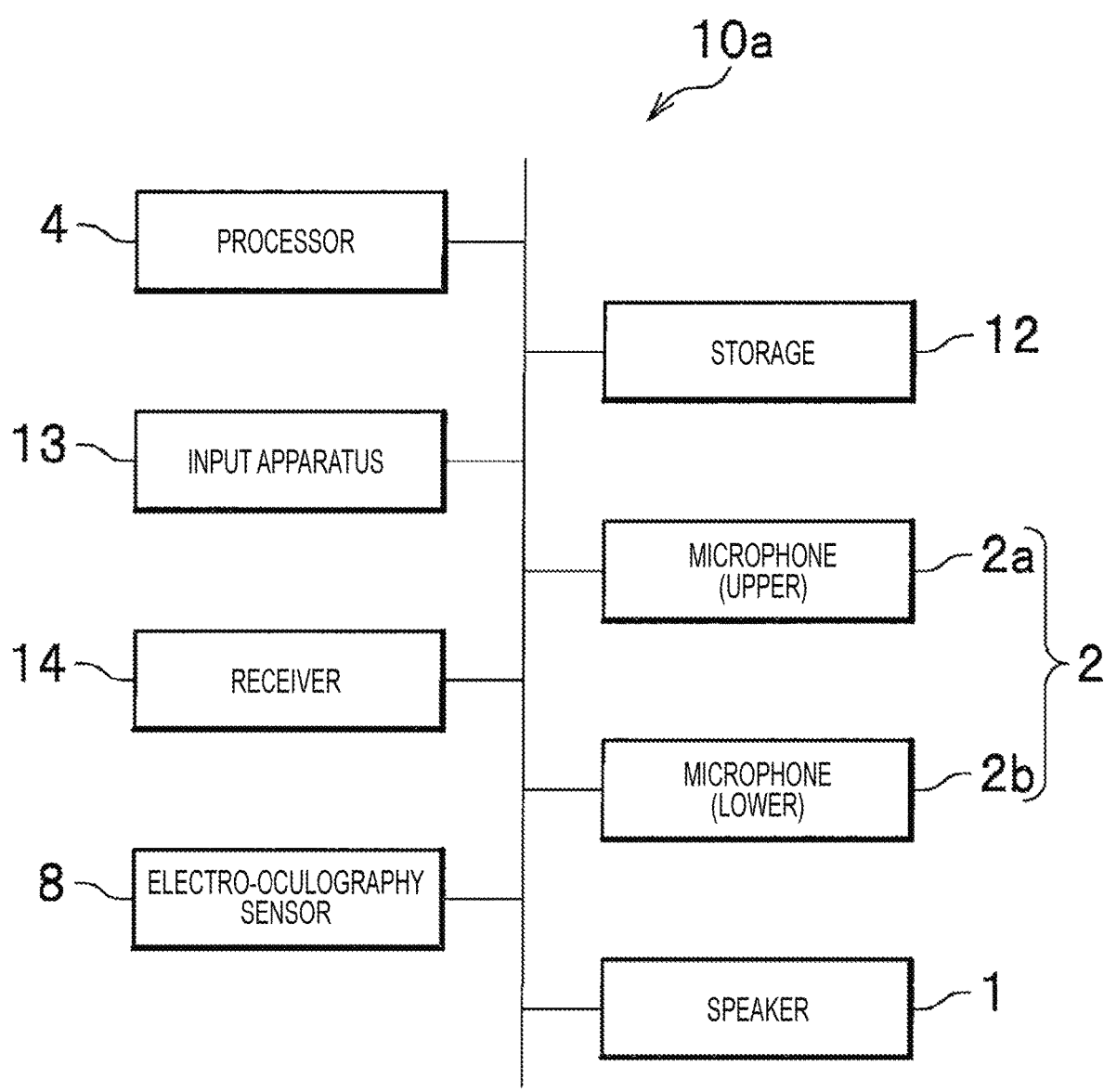
FIG. 2 is a configuration diagram of a sound collecting device in the first embodiment.

FIG. 2 is a configuration diagram of the sound collecting device in the first embodiment.

The sound collecting device 10a further includes a storage 12, the input apparatus 13, and a receiver 14 in addition to the processor 4, the microphone 2 (2a and 2b), the speaker 1, and the electro-oculography sensor 8, described above. The storage 12 includes a random access memory (RAM) used as a working memory of audio signal processing and a read only memory (ROM) storing, for example, user-specific setting conditions input from the input apparatus 13.

The receiver 14 of one sound collecting device 10a performs wireless communication by Bluetooth (registered trademark) with the other sound collecting device 10b in a pair. For example, the receiver 14 of the left-side sound collecting device 10a receives the eye potential or the angle of the line-of-sight from the right-side sound collecting device 10b in a pair as the line-of-sight information, and also receives the audio signal (the other audio signal) of the right-side microphone 2R. In addition, the receiver 14 of the sound collecting device 10a transmits the line-of-sight information of its own device and the audio signal of its own device to the other sound collecting device 10b in a pair.

FIG. 3 is a diagram illustrating a method of using the sound collecting device set in the first embodiment.

The sound collecting device set 100 is a binaural hearing aid set, with the two sound collecting devices 10a and 10b being connected to each other to enable wireless communication (Bluetooth (registered trademark)). With this configuration, the sound collecting device 10a can obtain line-of-sight information (line-of-sight information on the basis of the electro-oculography sensor 8a) of its own device, line-of-sight information (line-of-sight information on the basis of the electro-oculography sensor 8b) of the other device (sound collecting device 10b), together with the audio signal of the own device (audio signal of the microphone 2L) and the audio signal of the other device (audio signal of the microphone 2R). The sound collecting devices 10a and 10b are worn on the left and right ears of a same person in use.

Figure 4A:
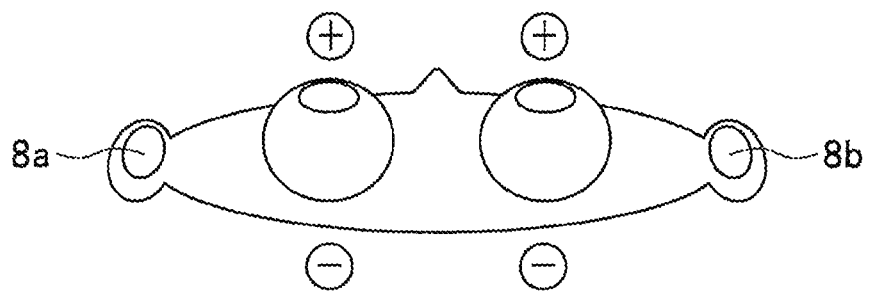
FIGS. 4A to 4C are explanatory diagrams illustrating a basic principle of an EOG method.
Figure 4B:
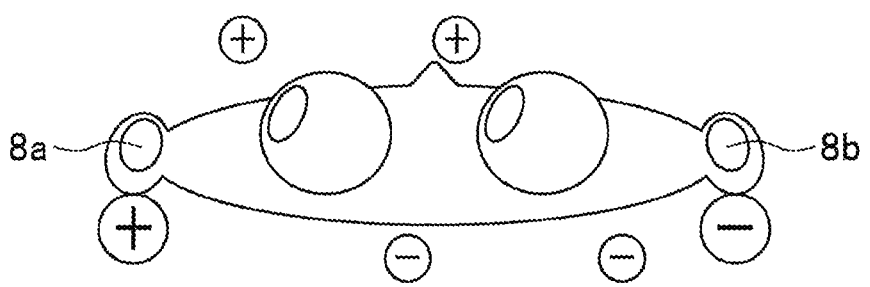
Figure 4C:
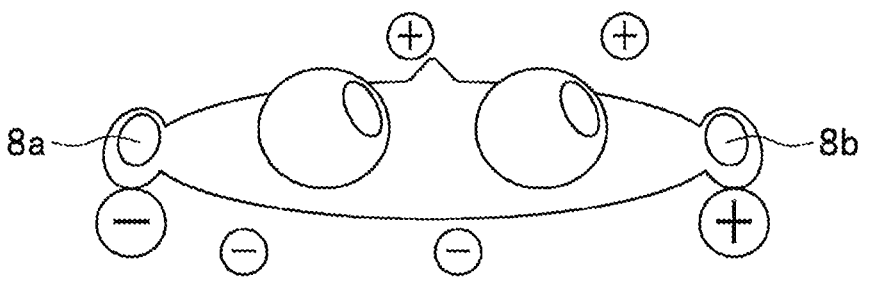

FIGS. 4A to 4C are explanatory diagrams illustrating the basic principle of the electro-oculogram (EOG) method, in which FIG. 4A illustrates a case facing the front, FIG. 4B illustrates a case facing the left, and FIG. 4C illustrates a case facing the right. The electro-oculography sensor 8a is arranged in the vicinity of the left eye, while the electro-oculography sensor 8b is arranged in the vicinity of the right eye. In addition, the eyeball is represented by an electric dipole having a positive charge on the front side and a negative charge on the back side. Here, it is assumed that the center of the electric dipole passes through an axis connecting the electro-oculography sensor 8a and the electro-oculography sensor 8b.

In the case of facing the front in FIG. 4A, since the electric dipoles is parallel to the front-rear direction, the eye potential is positive-negative canceled out and to be substantially the ground potential. Note that FIG. 4A illustrates a case where the target speaker is at an infinite distance, in which the parallax angle $(\theta R - \theta L) = 0$ described with reference to FIGS. 7A and 7B below. In the case of facing the left in FIG. 4B, the electric dipole inclines in the left direction. As a result, the electro-oculography sensor 8a for the left eye detects the positive eye potential, while the electro-oculography sensor 8b for the right eye detects the negative eye potential. In the case of facing the right in FIG. 4C, the electric dipole inclines to the right. As a result, the electro-oculography sensor 8a for the left eye detects the negative eye potential, while the electro-oculography sensor 8b for the right eye detects the positive eye potential. In other words, the processor 4 (FIG. 2) can determine whether the eyes are facing front, left, or right in accordance with the polarity of the eye potential detected by the two electro-oculography sensors 8a and 8b arranged in the vicinity of both eyes.

Figure 5:
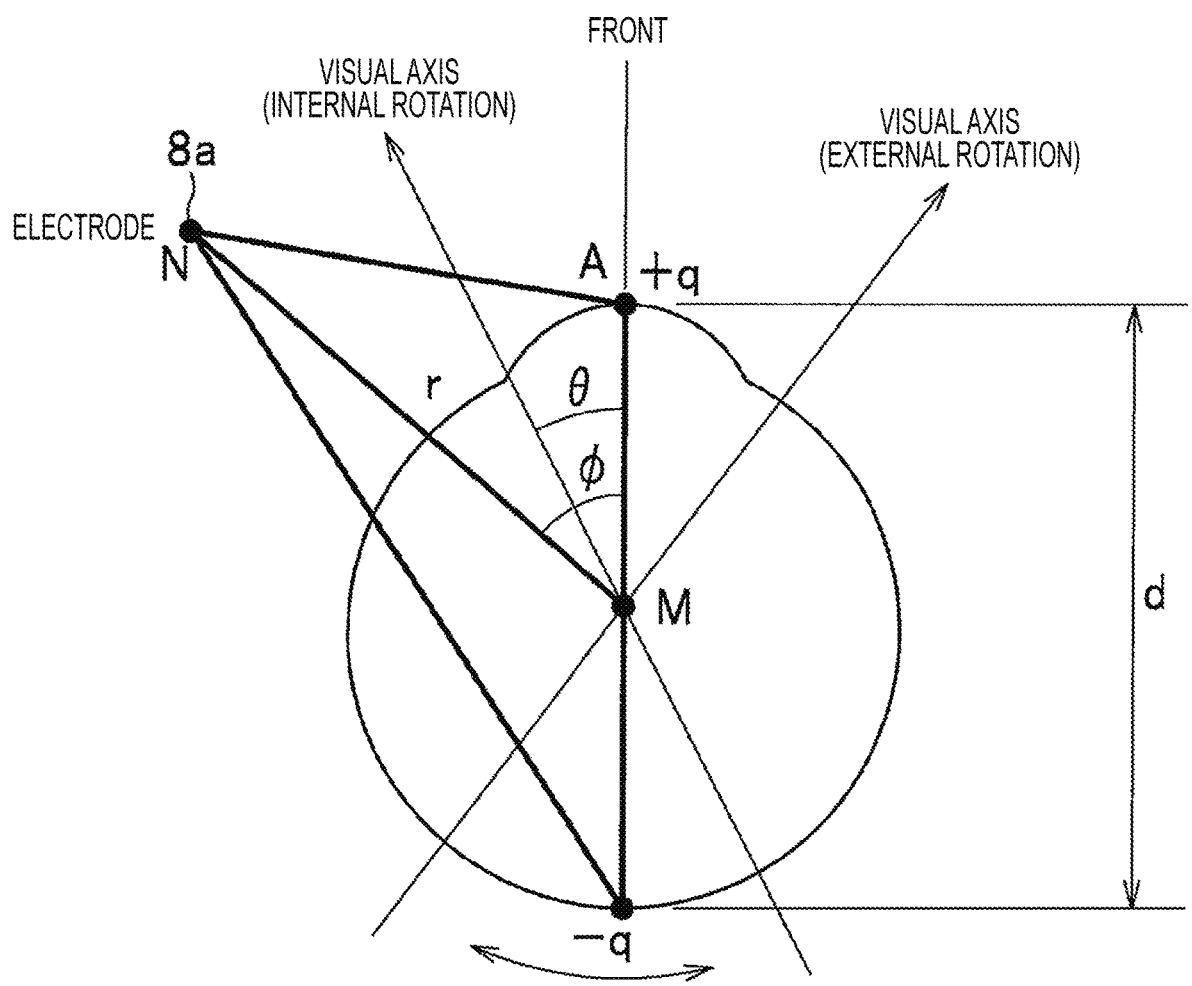
FIG. 5 is an explanatory diagram illustrating a relationship between the inclination of an eyeball and eye potential.

FIG. 5 is an explanatory diagram illustrating a relationship between the inclination of an eyeball and eye potential.

The electro-oculography sensor 8 (8a) is arranged in the vicinity of the eyeball. Rotation of the eyeball is expressed by rotation of the electric dipole having positive and negative charges. The angle formed by the straight line MN connecting the electro-oculography sensor 8a with a center M of the electric dipole and the front direction is defined as $\varphi$, and the rotation angle of the electric dipole (visual axis) is defined as $\theta$. At this time, the angle formed by the electric dipole and the straight line MN when the electric dipole (visual axis) rotates is $(\varphi - \theta)$.

The potential (eye potential) $\varphi(r)$ of the electric dipole detected by the electro-oculography sensor 8 is:

$\varphi(r) = 1/(4\pi\varepsilon 0) \cdot p \cos(\varphi - \theta)/r2$. That is, the rotation angle $\theta$ can be obtained from the change in the eye potential $\varphi(r)$. Herein, r is a distance between the center of the electric dipole and the electro-oculography sensor 8, and p is a product of a length d of the electric dipole and a charge q.

Figure 6:
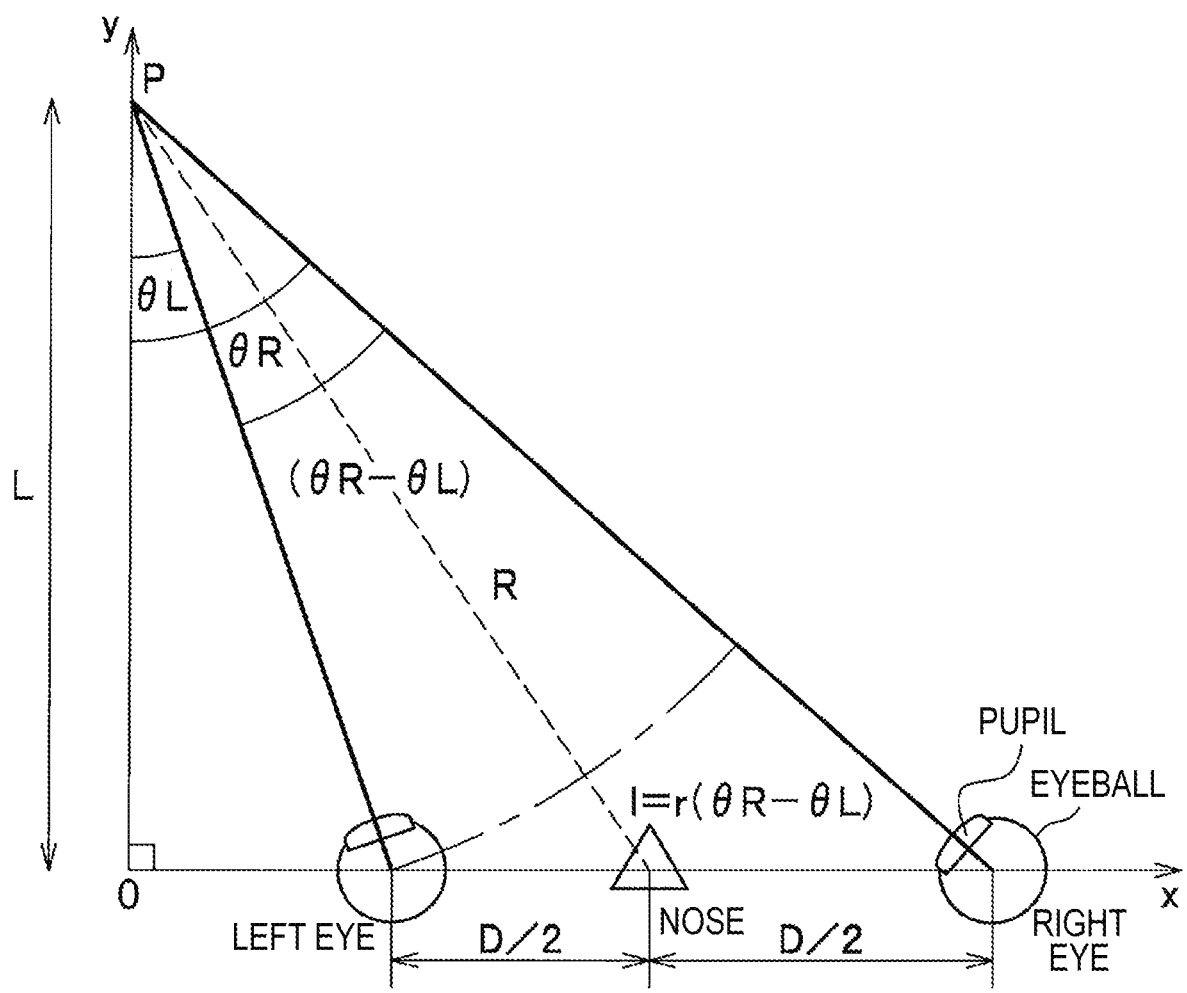
FIG. 6 is an explanatory diagram illustrating a relationship between a position of a speaker and parallax angle.

FIG. 6 is an explanatory diagram illustrating a relationship between a position of a speaker and a parallax angle.

When the angle formed by the axis (y axis) orthogonal to the axis (x axis) passing through both eyes (left eye, right eye) and passing through a speaker P (y axis) and the left eye is defined as $\theta L$, and the angle formed by the y axis and the right eye is defined as $\theta R$, then, the parallax angle is $(\theta R - \theta L)$. A length 1 of an arc of the parallax angle $(\theta R - \theta L)$ is $1 = R(\theta R - \theta L)$, where R is a distance from the speaker P. With approximation of the distance D between the eyes by $D \approx 1$, a distance R to the speaker P would be $R \approx D/(\theta R - \theta L)$.

Accordingly, the line-of-sight direction of the left eye (rotation angle $\theta L$ of eyeball) can be obtained from the change in the left eye's eye potential $\varphi L(r)$, while the line-of-sight direction of the right eye (rotation angle $\theta R$ of eyeball) can be obtained from the change in the right eye's eye potential $\varphi R(r)$. Furthermore, with the use of the parallax angle $(\theta R - \theta L)$, it is possible to calculate the distance R from the both eyes of the wearer of the sound collecting device set 100 to the speaker P.

Figure 7A:
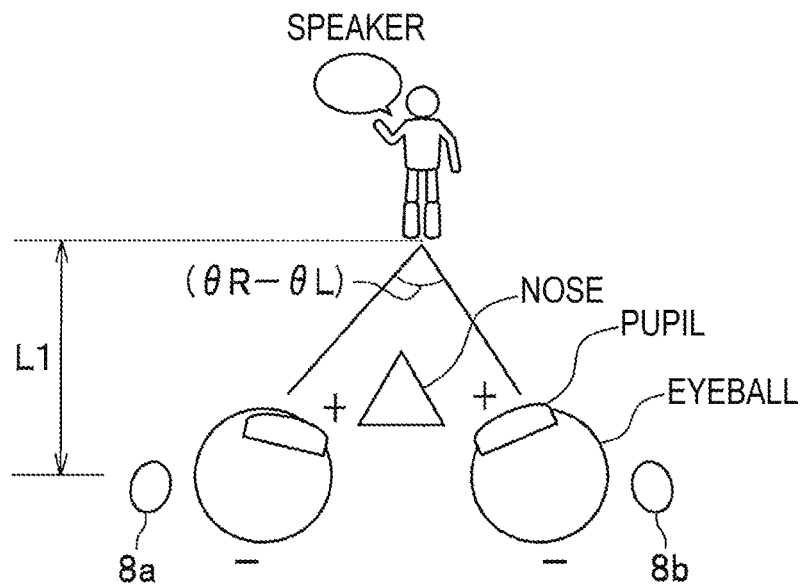
FIGS. 7A and 7B are diagrams illustrating a relationship between left and right angular differences and a distance.
Figure 7B:
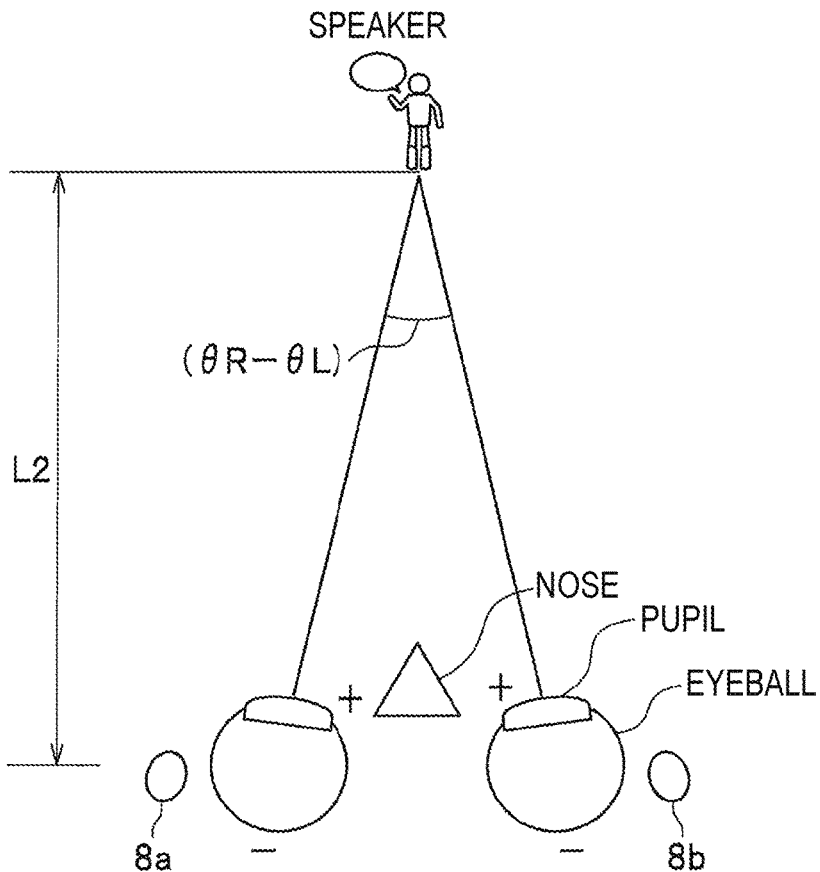

FIGS. 7A and 7B are diagrams illustrating a relationship between the left and right parallax angles and the distance, in which FIG. 7A illustrates a case where the left and right parallax angle $\theta$ is large, and FIG. 7B illustrates a case where the left and right parallax angle $\theta$ is small. Note that the eyes face front in each of the cases of FIGS. 7A and 7B.

In FIG. 7A, the parallax angle $\theta$ is large, and thus, a distance L1 to the speaker is short. In FIG. 7B, the parallax angle $\theta$ is small, and thus, a distance L2 to the speaker is long. In addition, since the electric dipoles of the eyeball face inward, the eye potentials detected by the left and right electro-oculography sensors 8a and 8b are of negative polarity. That is, when facing the front, the eye potentials detected by the left and right electro-oculography sensors 8a and 8b have the same polarity.

FIG. 8 is a diagram illustrating a relationship between a position of a speaker and a polar pattern.

It is assumed that a wearer (user) of the sound collecting device set 100 listens to the voice of one of three speakers A, B, and C. It is also assumed that the speaker A talks to the user from the left side, the speaker B talks to the user from the front, and the speaker C talks to the user from the right side. In addition, it is assumed that the distance between the speaker A and the user is equal to the distance between the speaker B and the user, while the distance between the speaker C and the user is longer than the distance between the speaker A, B and the user.

In order to listen to the voice of the speaker A, it is preferable that the center axis of the polar pattern A of the microphone 2 is aligned with the left direction. In order to listen to the voice of the speaker B, it is preferable that the center axis of the polar pattern B of the microphone 2 is aligned with the front direction. In order to listen to the voice of the speaker C, it is preferable that the center axis of the polar pattern C of the microphone 2 is aligned with the right direction. In addition, the polar pattern C used in listening to the voice of the speaker C has a longer distance to the speaker C than the distance to the speakers A and B. Accordingly, it is preferable to set the width of the polar pattern C narrower than the width of the polar patterns A, B in order to reduce the voice (noise) from the speakers A and B.

Under this circumstance, in a case where the microphone 2 has an omni-directional polar pattern, the voice of the speakers A and C is also heard even when conversation is made with the speaker B, hindering concentration on the conversation. In addition, in another case where the microphone 2 is unidirectional and set so as to achieve higher sensitivity toward the front of the user, the user needs to intentionally direct one's face to the speaker. With a method, however, of changing the polar pattern of the microphone 2 so as to achieve high sensitivity in the line-of-sight direction regardless of the direction of the face or the body, it is possible to collect sound from a person or object (sound source) of interest with more natural operation.

Meanwhile, the directional angle of the polar pattern (sensitivity curve, directional characteristic) is defined as an angle between positions where the sensitivity level of the microphone 2 decreases by 6 dB (that is, the angle at which the sensitivity becomes ½, referred to as a half value angle). Therefore, it would be preferable to set the parallax angle ($\theta$R−$\theta$L) calculated using the left and right eye potentials to be proportional to the directional angle of the polar pattern. This allows the polar pattern in the case of a distant speaker to be narrow and the polar pattern in the case of a nearby speaker to be wide. Here, the sensitivity level of the microphone 2 is a decibel value of a ratio between an open output voltage generated at an output terminal and the free sound field sound pressure when the microphone is placed in the free sound field of plane traveling sine waves. At this time, 1 [V/Pa] is set to 0 dB (JIS C 5502-1991).

Figure 9:
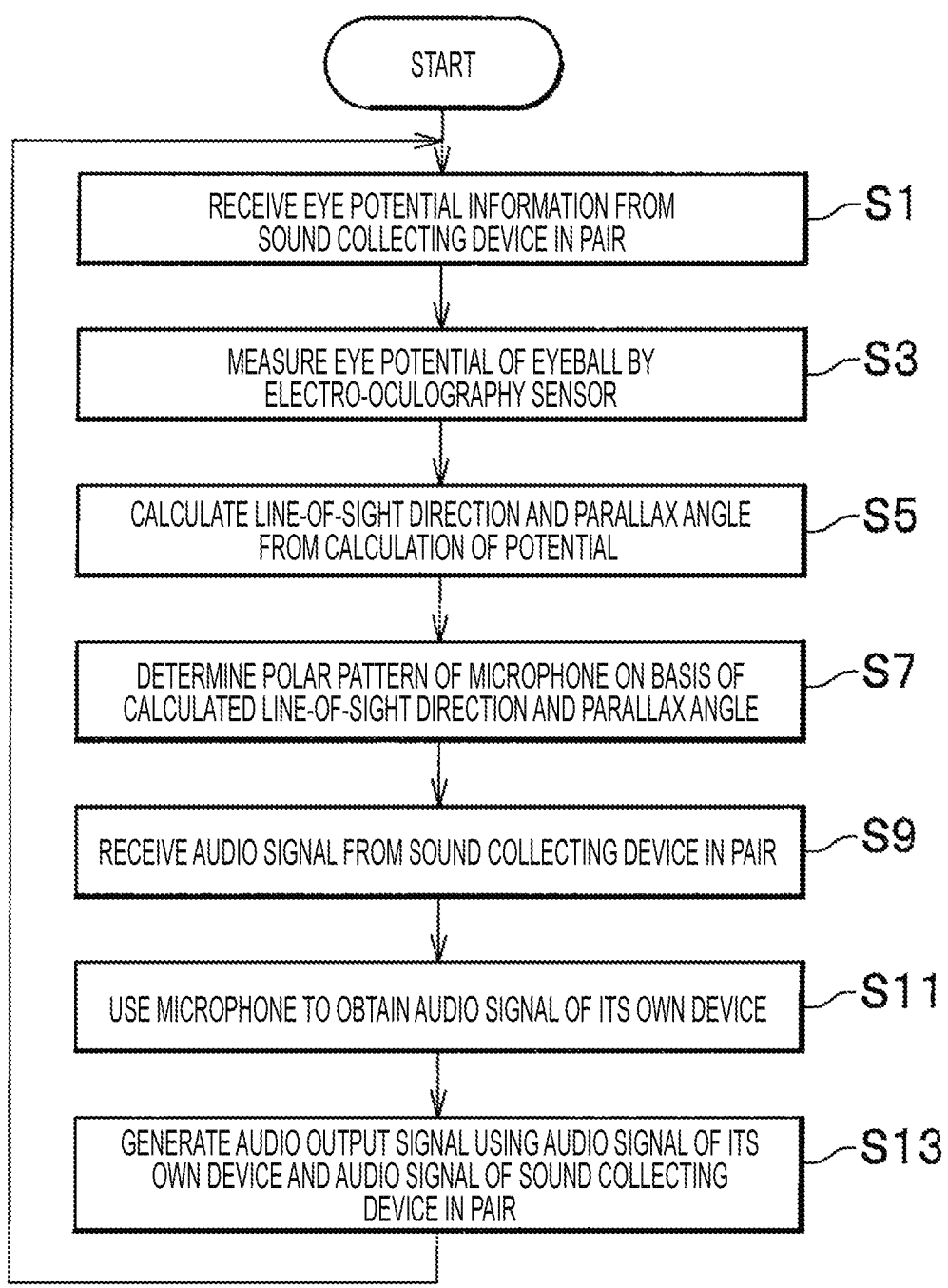
FIG. 9 is a flowchart illustrating operation of the sound collecting device in the first embodiment.

FIG. 9 is a flowchart illustrating operation of the sound collecting device in the first embodiment.

This routine is activated by power-on or resetting the sound collecting device 10a.

The processor 4 (FIG. 2) causes the receiver 14 to receive information of eye potential (angle $\theta$R of the line-of-sight direction) from the sound collecting device 10b in a pair (S1).

After S1, the processor 4 measures the eye potential $\varphi$L of the eyeball with the electro-oculography sensor 8 of its own device (S3). After S3, the processor 4 calculates the line-of-sight direction (angle $\theta$L) and the parallax angle ($\theta$L−$\theta$R) (S5). After S5, the processor 4 determines the polar pattern of the microphone 2 on the basis of the calculated line-of-sight direction and the parallax angle ($\theta$L−$\theta$R) (S7). After S7, the audio signal of a fixed period is received from the sound collecting device 10b in a pair (S9). After S9, the audio signal of the own device is obtained using the microphone 2 (S11). After S11, an audio output signal on the own device (sound collecting device 10a) side is generated using the audio signal of the own device and the audio signal of the sound collecting device 10b in a pair (S13). This allows the speaker 1 to emit sound. Then, the processing returns to S1 and the processing are repeated. Then, the processing is stopped by an interrupt or the like. Note that the other device (sound collecting device 10b) in a pair combines the audio signals of the two microphones 2L and 2R in a similar manner to generate the audio output signal on the sound collecting device 10b side, so as to cause the speaker 1 to emit sound.

As described above, each of the sound collecting devices 10a and 10b constituting the sound collecting device set 100 is a hearing aid having the microphone 2, the speaker 1, the electro-oculography sensor 8, and the processor 4. The processor 4 can calculate the direction of the line-of-sight (angles $\theta$L and $\theta$R) and the parallax angle ($\theta$R−$\theta$L) on the basis of the eye potential. The processor 4 determines the direction and width of the polar pattern of the microphone 2 on the basis of the direction of the line-of-sight (angles $\theta$L and $\theta$R) and the parallax angle ($\theta$R−$\theta$L), and performs the audio signal processing of the microphone 2 (2L and 2R). Then, the processor 4 amplifies the audio output signal of the processor 4 as an own device with the amplifier, and outputs the amplified audio output signal to the speaker 1.

(Second Embodiment)

The sound collecting device set 100 according to the first embodiment realizes the function by both the sound collecting device 10a hooked on one of the left and right ears and the sound collecting device 10b hooked on the other ear. In contrast, the sound collecting device of the present embodiment is of eyeglass type, and realizes an equivalent function by a single device.

Figure 10:
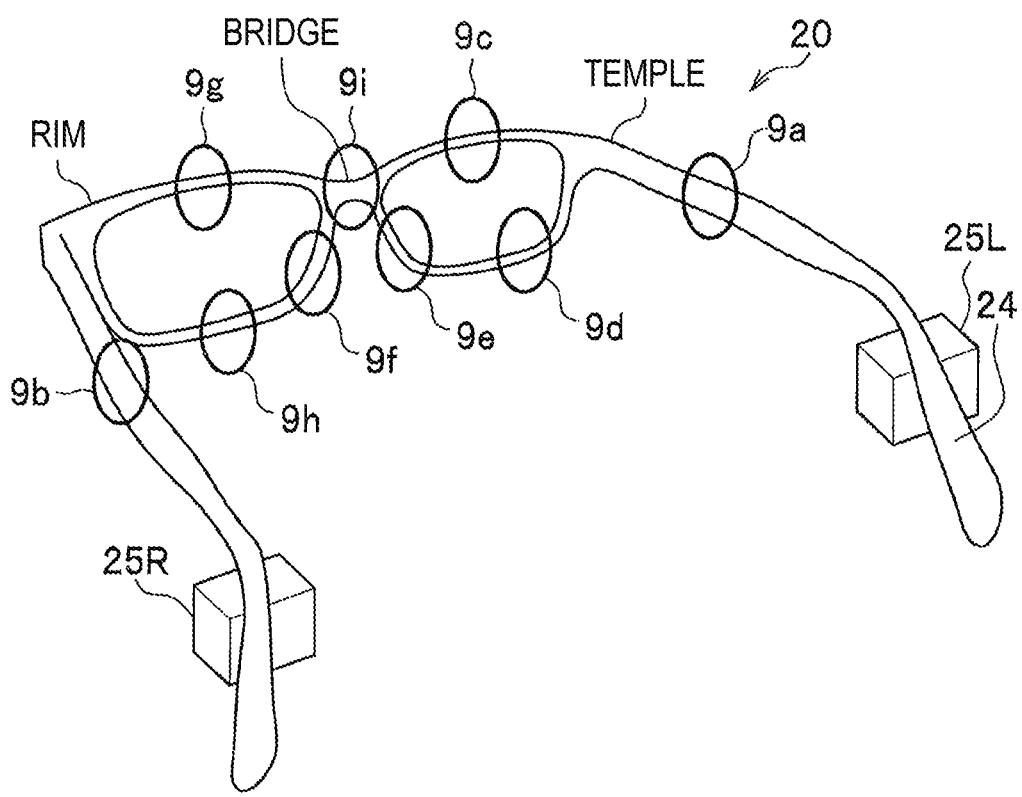
FIG. 10 is a perspective view illustrating an appearance of a sound collecting device in a second embodiment.

FIG. 10 is a perspective view illustrating an appearance of a sound collecting device in the second embodiment.

A sound collecting device 20 includes a pair of eyeglass type attachment portions 24, electro-oculography sensors 9a and 9b attached to the left and right temples, and a plurality of electro-oculography sensors 9c, 9d, 9e, 9f, 9g, and 9h attached to left and right rims, a ground electrode 9i attached to a bridge, and acoustic transducers 25L, 25R attached to the left and right temples.

The electro-oculography sensors 9a, 9b, 9c, 9d, 9e, 9f, 9g, and 9h have similar functions as the electro-oculography sensor 8 of the first embodiment, except that the ground electrode 9i is used as a shared ground electrode. Each of the acoustic transducers 25L and 25R includes the microphone 2, the speaker (receiver) 1, the processor 4, and a battery (FIG. 2), and are connected to each other by wired communication via a cable (not illustrated) passing through the inside of the temple, rim and bridge of the attachment portion 24.

Figure 11:
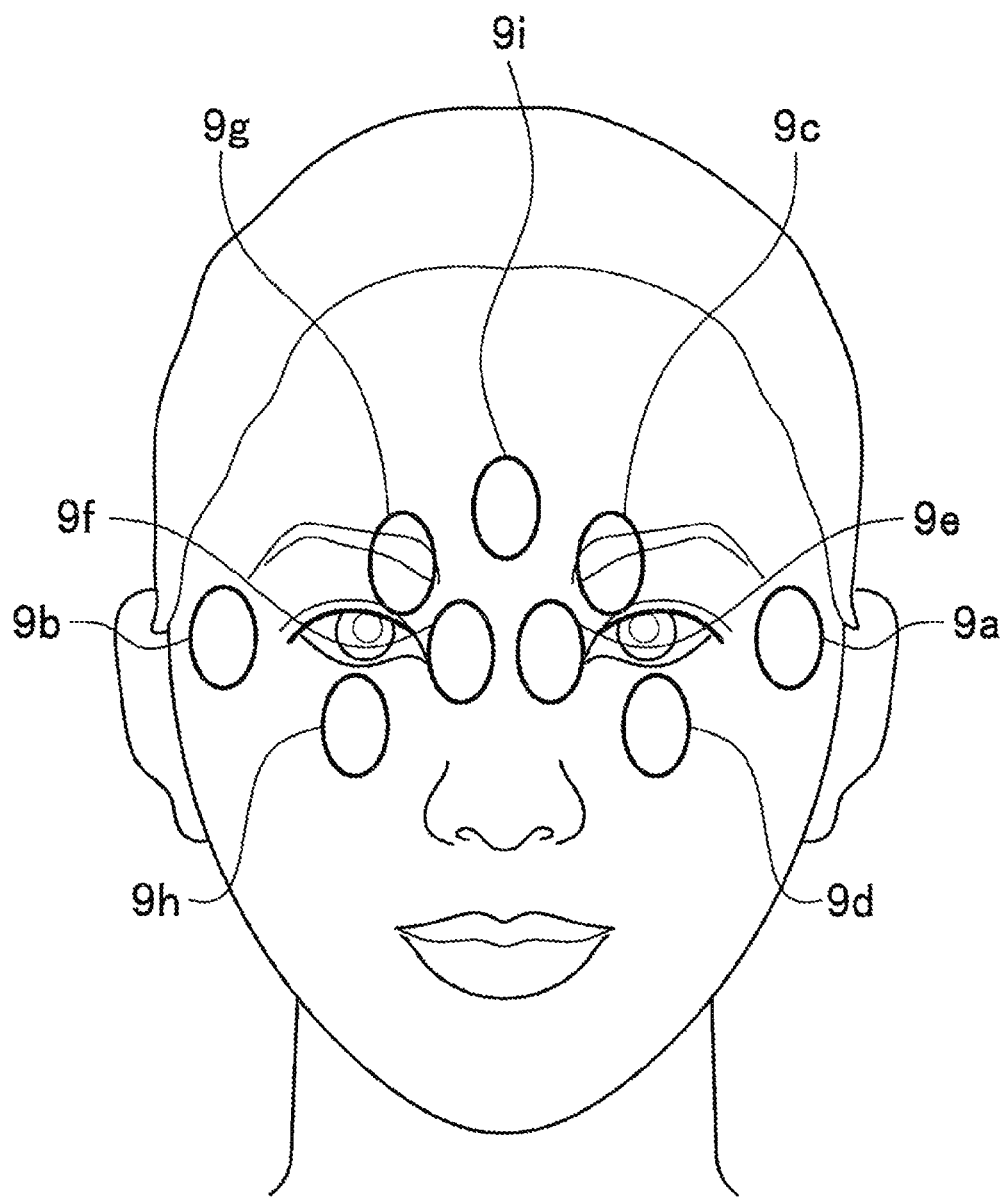
FIG. 11 is a diagram illustrating measurement positions where the sound collecting device in the second embodiment measures the eye potential.

FIG. 11 is a diagram illustrating measurement positions where the sound collecting device in the second embodiment measures the eye potential.

The positions illustrated on the face are positions where the electro-oculography sensors 9a, 9b, 9c, 9d, 9e, 9f, 9g, and 9h come in close proximity to the face and where the ground electrode 9i comes in contact with the face. Unlike the electro-oculography sensor 8 (FIG. 1) in the first embodiment, the sound collecting device 20 includes the electro-oculography sensors on the upper, lower, left and right positions around the eye. Accordingly, it is possible to use an appropriate electro-oculography sensor or apply weighting in accordance with the moving direction of the eyeball (polarity of the eye potential). This enables the sound collecting device 20 to detect the line-of-sight direction with higher accuracy.

(Third Embodiment)

While each of the sound collecting devices 10 and 20 in the first and second embodiments detects the line-of-sight using the electro-oculography sensors 8 and 9, respectively, it is also possible to detect the line-of-sight using a visible ray camera.

Figure 12:
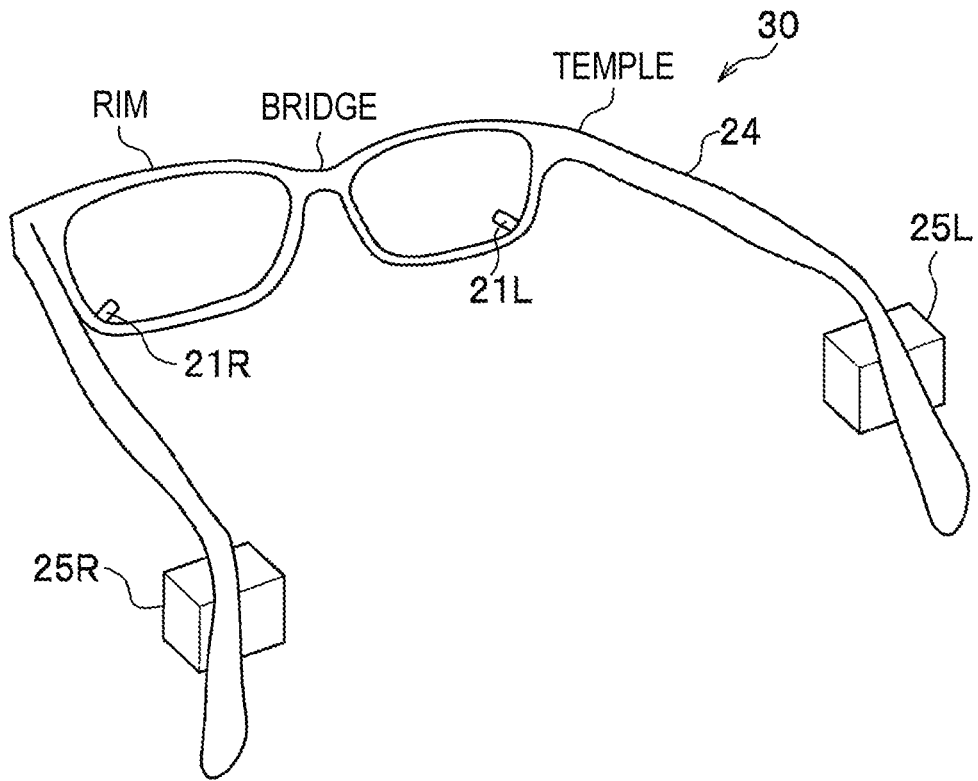
FIG. 12 is a perspective view illustrating an appearance of a sound collecting device in a third embodiment.

FIG. 12 is a perspective view illustrating an appearance of a sound collecting device in a third embodiment.

A sound collecting device 30 includes the eyeglass type attachment portion 24, ultra small visible ray cameras 21L and 21R attached to the left and right rims, and acoustic transducers 25L and 25R attached to the left and right temples. The ultra small visible ray cameras 21L and 21R are arranged so as to capture images of eyes. Note that while the ultra small visible ray cameras 21L and 21R are fixed to the lower side of the rim, they may be fixed to the upper side.

Figure 13:
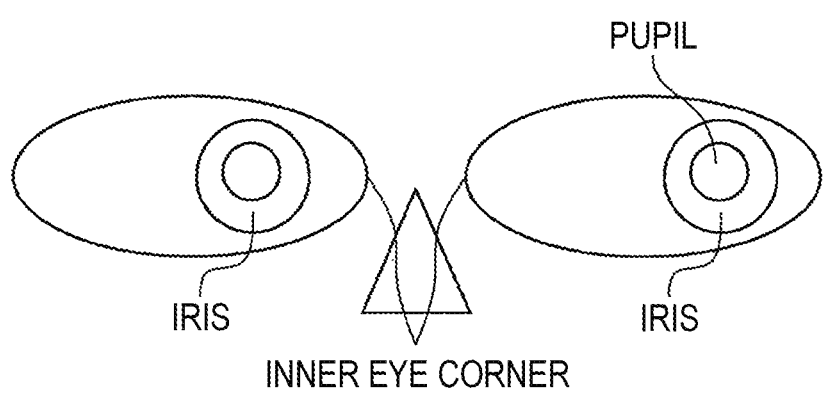
FIG. 13 is an explanatory diagram illustrating a line-of-sight detection method of a sound collecting device in a third embodiment.

FIG. 13 is an explanatory diagram illustrating a method of detecting the line-of-sight by a sound collecting device in the third embodiment.

The surface of the eye includes conjunctiva, iris and pupil. The ultra small visible ray cameras 21L and 21R image the inner corners and the irises, and the processor 4 (FIG. 2) inside each of the acoustic transducers 25L and 25R detects the line-of-sight on the basis of the position of the iris (moving point) with respect to the inner eye corner (reference point). For example, the processor 4 determines that the gazing direction is leftward when the iris and the inner eye corner of the left eye are separated from each other, while the processor 4 determines that the gazing direction is rightward when the inner eye corner and the iris of the left eye are close to each other.

(Fourth Embodiment)

While the sound collecting device 30 in the third embodiment uses a visible ray camera, it is also possible to use an infrared camera.

Figure 14:
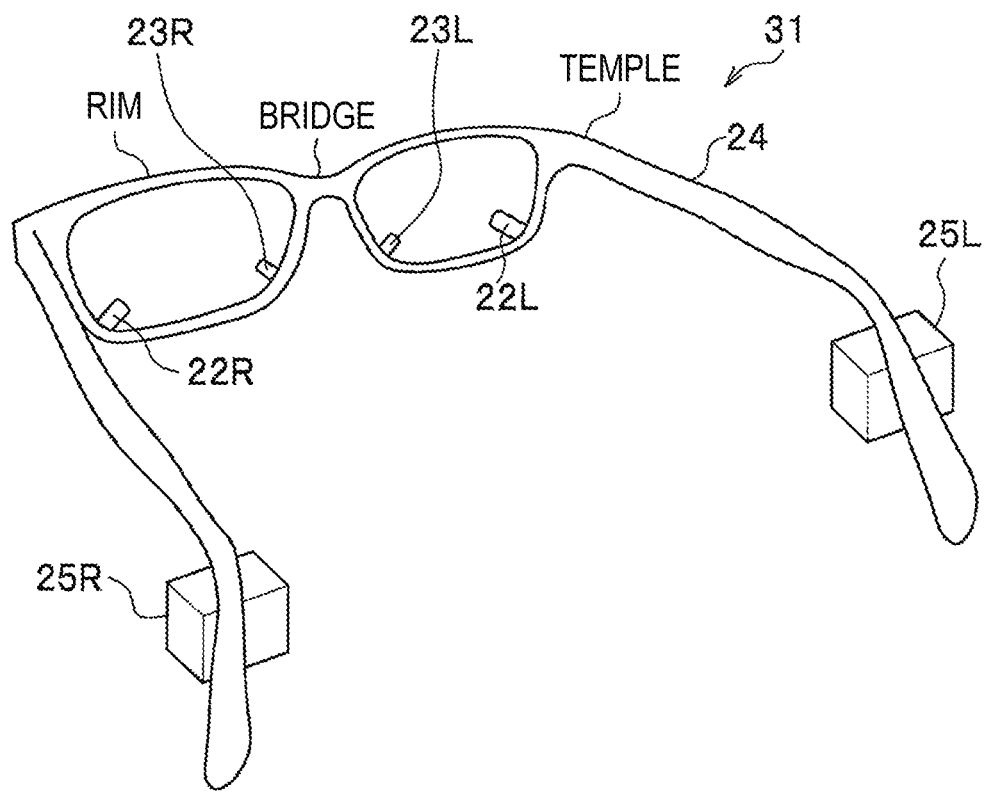
FIG. 14 is a perspective view illustrating an appearance of a sound collecting device in a fourth embodiment.

FIG. 14 is a perspective view illustrating an appearance of a sound collecting device in a fourth embodiment.

A sound collecting device 31 includes the eyeglass type attachment portion 24, ultra small infrared cameras 22L and 22R attached to the left and right rims, infrared LED 23L and 23R attached to left and right rims, and acoustic transducers 25L and 25R attached to the left and right temples. Each of the ultra small infrared cameras 22L and 22R captures an infrared image of the eye. The infrared LEDs 23L and 23R illuminate the eyes with infrared rays. While the ultra small infrared cameras 22L and 22R and the infrared LEDs 23L and 23R are fixed to the lower side of the rim, they may be fixed to the upper side.

Figure 15:
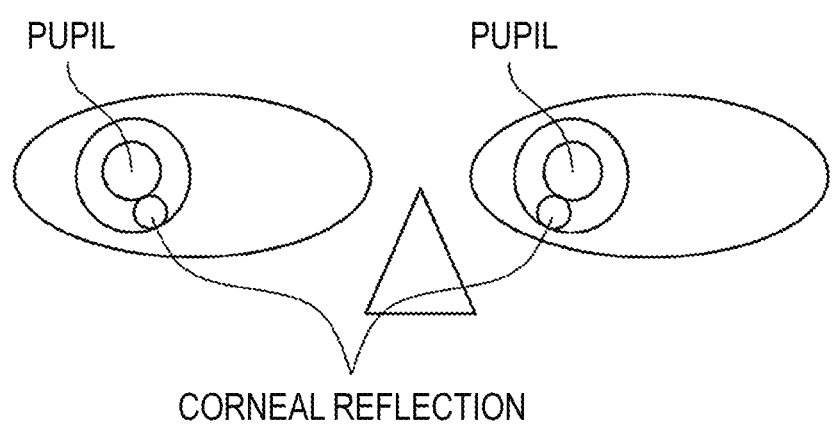
FIG. 15 is an explanatory diagram illustrating a method of detecting the line-of-sight of the sound collecting device in the fourth embodiment.

FIG. 15 is an explanatory diagram illustrating a method of detecting the line-of-sight by a sound collecting device in the fourth embodiment.

While the ultra small infrared cameras 22L and 22R allow the infrared LEDs 23L and 23R to be turned on respectively, the processor 4 (FIG. 2) detects the line-of-sight on the basis the position of the pupil (moving point) with respect to the position (reference point) of corneal reflection (light source image) reflected by the cornea. For example, the processor 4 determines that the gazing direction is leftward when the pupil is more closer to the outer eye corner than the corneal reflection of the left eye, while the processor 4 determines that the gazing direction is rightward when the pupil is more closer to the inner eye corner than the corneal reflection.

Modification

The present invention is not limited to the above-described embodiments, and various modifications as described below are possible, for example.

While each of the sound collecting devices 10, 30, and 31 of the above-described embodiment includes a microphone on the left and right, it is not limited thereto, and the microphone may be provided in only one of the left and right sides and directions of the microphones may be controlled on the basis of the left and right line-of-sight directions.

In addition, while each of the sound collecting devices 10, 30, and 31 of the above-described embodiments includes a microphone on the right and the left sides, using an eyeglass type attachment portion enables a plurality of microphones 2 to be arranged spaced apart from each other in the left-right direction on the rim, achieving a microphone array. This leads to acquisition of a plurality of audio signals having a phase difference, enabling the processor 4 (FIG. 2) to appropriately change the width of the polar pattern.

The sound collecting device set 100 in the first embodiment includes the processor 4 (FIG. 2) on the left and right positions. That is, the left sound collecting device 10a delays one of the audio signal obtained by the microphone 2L of its own device (sound collecting device 10a) and the audio signal obtained by the microphone 2R of the other device (sound collecting device 10b), combines the delayed audio signal and the other audio signal to generate an audio output signal on its own device side (left side). In addition, the right-side sound collecting device 10b delays one of the audio signal obtained by the microphone 2R of its own device (sound collecting device 10b) and the audio signal obtained by the microphone 2L of the other device (sound collecting device 10a), combines the delayed audio signal and the other audio signal to generate an audio output signal on its own device side (right side).

In contrast, a sound collecting device set 101 may allow one sound collection device 10c alone to have the processor 4 (FIG. 2) that executes audio signal processing and may allow the other sound collection device 10d to have a processor 4b that does not execute audio signal processing. That is, the left-side sound collecting device 10c delays one of the audio signal obtained by the microphone 2L of its own device (sound collecting device 10c) and the audio signal obtained by the microphone 2R of the other device (sound collecting device 10d), combines the delayed audio signal and the other audio signal to generate an audio output signal on its own device side (left side), and also generates an audio output signal of the other apparatus (sound collecting device 10d) side. Then, the processor 4 can transmit an audio output signal to the other apparatus side via the receiver 14.

While the above embodiment uses an electro-oculography sensor, it is also possible to measure the eye potential and detect the line-of-sight even by using the search coil method.

The invention claimed is:

1. A sound collecting device comprising:
   a line-of-sight detector configured to detect first line-of-sight information of user's eyes;
   a microphone;
   a processor configured to control the microphone;
   a receiver configured to receive, from another device, second line-of-sight information different from the first line-of-sight information; and
   an attachment portion for attaching the line-of-sight detector and the microphone on a head portion or an ear portion,
   wherein the processor controls the microphone so as to achieve sensitivity in a line-of-sight direction of the eyes higher than in other directions based on the first line-of-sight information and the second line-of-sight information.

2. The sound collecting device according to claim 1, wherein the processor controls a direction of the microphone so as to achieve sensitivity in the line-of-sight direction higher than in other directions.

3. The sound collecting device according to claim 1, wherein the processor controls the microphone so as to attenuate an audio signal of the microphone in other directions differing from the line-of-sight direction.

4. The sound collecting device according to claim 1, wherein the line-of-sight detector detects the first line-of-sight by detecting an eye potential of an eye.

5. The sound collecting device according to claim 1, wherein the line-of-sight detector detects the first line-of-sight from a position of a pupil or iris of an eye imaged by a camera.

6. A sound collecting device comprising:
   a line-of-sight detector configured to detect first line-of-sight information of user's eyes;
   a microphone;
   a processor configured to control the microphone;
   a receiver configured to receive, from another sound collecting device in a pair, second line-of-sight information and an audio signal, the second line-of-sight information being different from the first line-of-sight information;
   an attachment portion for attaching the processor to an ear portion; and
   a speaker,
   wherein the processor controls the microphone so as to achieve sensitivity in the line-of-sight direction of the user higher than in other directions based on the first line-of-sight information and the second line-of-sight information received from the another sound collecting device by the receiver.

* * * * *